US008376082B2

(12) United States Patent
Grainger

(10) Patent No.: US 8,376,082 B2
(45) Date of Patent: Feb. 19, 2013

(54) TRIANGULAR INFLATABLE EVACUATION SLIDE

(76) Inventor: Michael Grainger, Derwent Park Tasmania (AU)

( * ) Notice: Subject to any disclaimer, the term of this patent is extended or adjusted under 35 U.S.C. 154(b) by 351 days.

(21) Appl. No.: 12/672,438

(22) PCT Filed: Aug. 28, 2008

(86) PCT No.: PCT/AU2008/001262
§ 371 (c)(1),
(2), (4) Date: Feb. 5, 2010

(87) PCT Pub. No.: WO2009/026631
PCT Pub. Date: Mar. 5, 2009

(65) Prior Publication Data
US 2011/0259668 A1    Oct. 27, 2011

(30) Foreign Application Priority Data
Aug. 29, 2007   (AU) .............................. 2007904657

(51) Int. Cl.
*A62B 1/20*        (2006.01)
*B63C 9/00*        (2006.01)
(52) U.S. Cl. ...................................................... 182/48
(58) Field of Classification Search .................. 182/48;
14/2.4; 244/137.2, 905, 118.3; 441/39, 40;
114/345, 354, 362; 52/2.11, 2.18, 2.23, 2.24,
52/2.22, 650.1, 650.2
See application file for complete search history.

(56) References Cited

U.S. PATENT DOCUMENTS

| 3,621,383 | A  | * | 11/1971 | Rush et al. ............. 324/414 |
| 3,679,025 | A  | * | 7/1972  | Rummel .................. 182/20 |
| 3,726,375 | A  | * | 4/1973  | Blate et al. ............. 193/25 B |
| 3,827,094 | A  | * | 8/1974  | Fisher .................... 441/38 |
| 4,332,049 | A  | * | 6/1982  | Fisher .................... 441/80 |
| 4,378,861 | A  | * | 4/1983  | Burrough et al. ........ 182/48 |
| 5,122,400 | A  | * | 6/1992  | Stewart ................. 428/34.7 |
| 6,536,715 | B1 | * | 3/2003  | Moran et al. .......... 244/137.2 |
| 6,655,633 | B1 | * | 12/2003 | Chapman, Jr. ......... 244/123.9 |
| 6,685,520 | B1 | * | 2/2004  | Wiggins ................. 441/40 |
| 7,546,654 | B2 | * | 6/2009  | Carmel .................. 14/2.4 |
| 2001/0046820 | A1 | * | 11/2001 | Vancil ................... 441/40 |
| 2004/0237225 | A1 | * | 12/2004 | To ........................ 14/73.5 |

FOREIGN PATENT DOCUMENTS
WO    WO 95/14605 A1    6/1995
WO    WO 95/15787 A1    6/1995

* cited by examiner

*Primary Examiner* — James O Hansen
*Assistant Examiner* — Kristine Florio
(74) *Attorney, Agent, or Firm* — Edwin D. Schindler

(57) ABSTRACT

An inflatable evacuation slide, substantially triangular in cross-section, includes a base and lateral sides. The sides are formed from interlocking components, so that the slide is straight, when deployed. The inflatable evacuation slide may be used, for example, as a marine evacuation slide.

9 Claims, 2 Drawing Sheets

TRIANGULAR INFLATABLE EVACUATION SLIDE

AREA OF THE INVENTION

Figure 1:
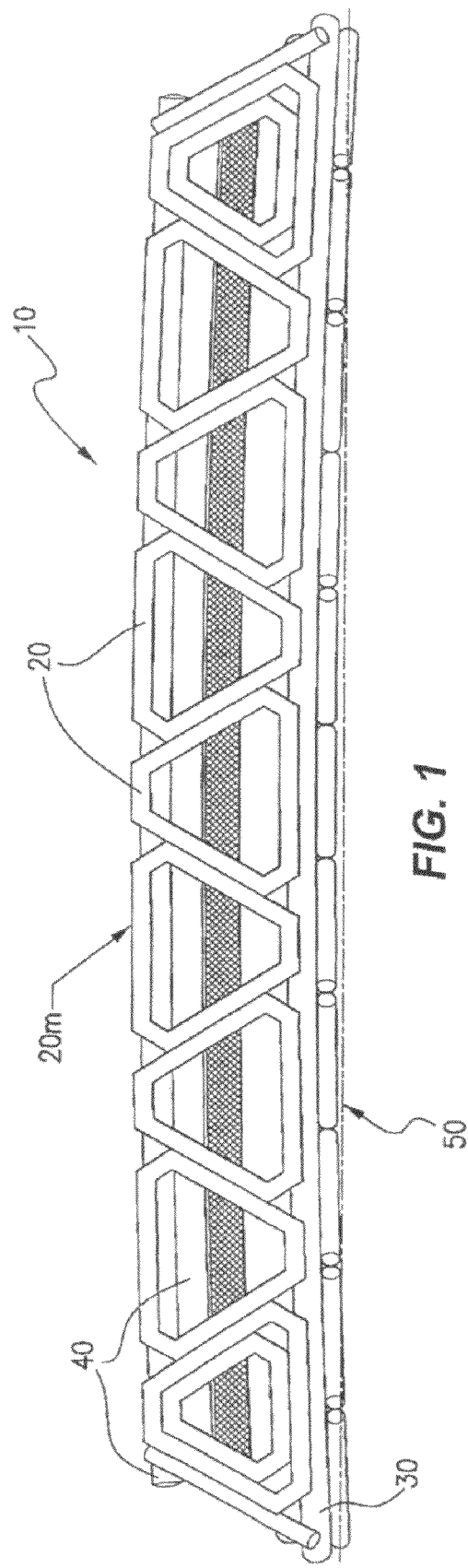

This invention relates to the area of marine safety equipment and in particular to a slide to be used in association with a liferaft.

BACKGROUND TO THE INVENTION

For many years the use of conventional lifeboats on board ships presented problems with respect to on board stowage, release and passenger loading. The latter two functions being effected only with the deployment of considerable manpower.

With the more recent development of inflatable liferafts however these require means for quickly and safely loading passengers.

This desirability for quick, safe evacuation procedures in turn led to the development of inflatable slides which are used by passengers to slide into the liferaft which is deployed in the water. These slides are known to rapidly inflate such that passengers can be quickly evacuated.

In order to improve passenger safety liferaft slides of this type have been developed which are relatively enclosed, to prevent a passenger falling, while being generally triangular in cross-section to increase both strength and stability.

These inflatable slides do however have the disadvantage that not only will they sag with the weight of occupants on the slide but are known to sag downwards under their own weight. This in turn increases the risk of "buckling" under load.

OUTLINE OF THE INVENTION

It is the object of this invention to provide in a marine evacuation system an inflatable evacuation slide which has a structure such that the slide is self supporting under its own weight when inflated and also when it is loaded with passengers.

The invention is an inflatable evacuation slide which slide is generally triangular in cross section and includes a base and lateral sides, said sides being structured from interlocking components such that the slide is straight when deployed.

It is preferred that the evacuation slide be deployed between a vessel and a liferaft.

It is further preferred that the lateral sides be comprised of a series of adjacent interlocking components which in a preferred embodiment of the invention are generally triangular and inverted generally triangular inflated members.

It is also preferred that the slide when inflated be straight under both its own weight and that of those using it for marine evacuation purposes.

In order that the invention may be more readily understood we shall describe by way of non limiting example a specific embodiment of the invention with reference to the accompanying drawing figures.

BRIEF DESCRIPTION OF THE DRAWING FIGURES

Figure 2:
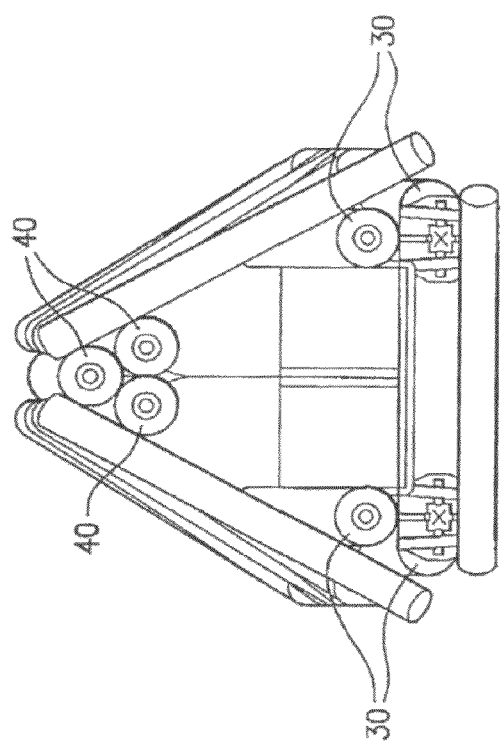
Figure 3:
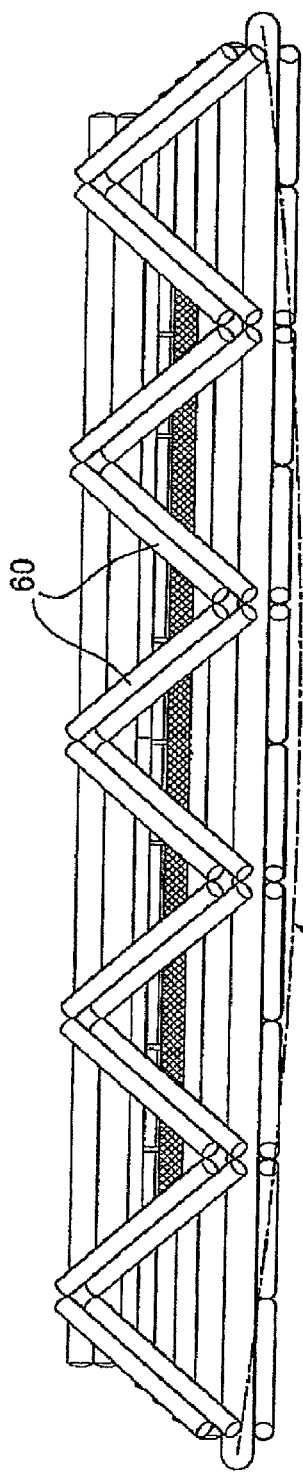
Figure 4:
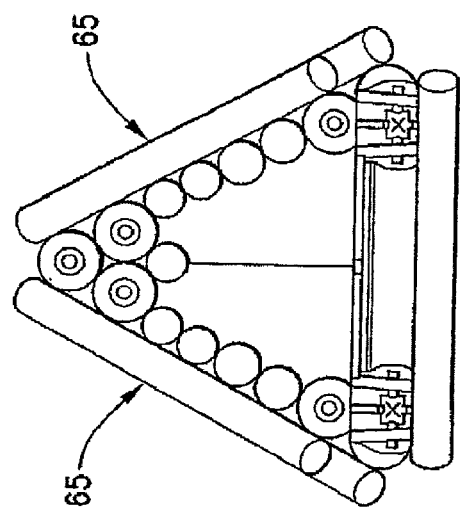

FIG. 1 Shows a side view of the slide of the invention when not under load;
FIG. 2 Shows an end view of the slide of FIG. 1;
FIG. 3 Shows a side view of a conventional marine evacuation slide;
FIG. 4 Shows an end view of the slide of FIG. 3;

DESCRIPTION OF AN EMBODIMENT OF THE INVENTION

In the preferred embodiment of the invention a 20 m slide is described although the concept of the invention applies generally to evacuation slides. These slides are subject to a combination of bending loads acting perpendicular to the slide and compressive loads acting parallel to the slide.

Most evacuation slides deflect or bend under their own weight which increases a slide's susceptibility to buckling deformation. In contrast the slide of the invention is designed and manufactured such that it becomes straight under its own weight when deployed.

The rigidity of the slide 10 is provided by forming the sides from interlocking generally triangular frames 20 that join to each other as well as the main slide frame 30 and top tubes 40, the angles of the triangular frames being determined such that when joined together an upwardly directed bend 50 in the slide is formed which straightens under the weight of the slide when inflated and deployed.

In contrast a conventional marine evacuation slide is shown in FIG. 3 and as can be seen the side brace tube assemblies 60 used to strengthen the lateral sides 65 are unconnected to each other and do not act to prevent movement which will lead to sagging under its own weight even in the absence of any additional passenger load.

The marine evacuation slides are triangular in cross-section as shown in FIGS. 2 and 4 as this is a shape which provides the simplest structurally sound mode of construction. The length of the slide used will also vary depending on the drop height required. The embodiment of the invention described however is 20 m in length.

As discussed here conventional slides (shown in FIG. 2) tend to sag under their own weight and the more a slide sags the more susceptible it becomes to both buckling loads and bending loads thereby impairing its required function.

The slide design of the invention as shown in FIG. 1 provides a pre bending arrangement 50 to the outstretched uninflated slide which directs it arcuately above the horizontal as shown.

When the slide is inflated the interlocking frames 20 act upon one and other when the slide is deployed such that, while any residual sag causes the slide to become straight, further downwards movement of the base 30 of the slide is restricted by the slide structure.

This result is achieved by the use of the tesselated interlocking triangular side braces as shown. While the precise shape of these members is not restricted in the invention the arrangement shown in FIG. 1 has proved to be most effective.

In this embodiment of the invention all the individual inflatable tubes of the slide are manufactured from a polyurethane coated nylon fabric using high frequency welding techniques.

The material used to manufacture these tubes is not restricted in the invention neither are the bonding and fabrication techniques used in manufacture in general, however all materials and methods of manufacture must comply with the relevant legislative requirements.

The base of the slide may be of any type preferred and is also not restricted in the invention neither is a strictly triangular cross section although the latter is preferred for strength considerations.

While the triangular side bracing members used to form the side walls of the slide are unique to the invention any slide construction which provides for an initially arcuately shaped slide base and orientation, which becomes straight when the slide is inflated, lies within the scope of the invention as does the use of tesselated side frame members.

Other design features of the slide relevant to materials used and details of interior bracing and the like can also be varied in the invention.

The invention described here provides a structurally sound evacuation slide for a liferaft which safely encloses the evacuating passengers and maintains its required shape in use and while we have described here one specific embodiment of the invention it is to be understood that variations and modifications in this can be made without departing from the spirit and scope of the invention.

The invention claimed is:

1. An inflatable evacuation slide, comprising:
   a base; and,
   lateral sides extending from said base and comprised of side frame members for maintaining said inflatable evacuation slide substantially straight when said inflatable evacuation slide is in a deployed position, said inflatable evacuation slide being substantially triangular in cross-section, wherein said lateral sides each include a series of alternately-oriented upright and inverted triangular frame members extending in a continuous pattern, and wherein a given triangular side frame member for supporting a part of a series of said triangular frame members includes a smaller triangular brace structure within said given triangular side frame member.

2. The inflatable evacuation slide according to claim 1, wherein angles of said triangular side frame members are determined such that, when joined together, an upwardly directed bend in said inflatable evacuation slide is formed, which straightens under weight of said inflatable evacuation slide when not under load, prior to placement into the deployed position.

3. The inflatable evacuation slide according to claim 1, wherein said side frame members of said lateral sides have a shape so that said side frame members prevent said inflatable evacuation slide from sagging, when inflated.

4. The inflatable evacuation slide according to claim 1, wherein said upright and inverted substantially triangular frames are hexagonal structures.

5. The inflatable evacuation slide according to claim 4, wherein said hexagonal structures each comprise three linear beams connected at three corners of the substantially triangular frames with corner struts, said linear beams being longer in length than lengths of said corner struts.

6. The inflatable evacuation slide according to claim 5, wherein said linear beams of each said substantially triangular frame are set at an angle relative to one another, said linear beams being further set at an angle of 60° to adjacent said corner struts.

7. The inflatable evacuation slide according to claim 5, wherein an upper said linear beam of one of said inverted substantially triangular frames is substantially horizontal and substantially coaxial with an upper said corner strut of an adjacent one of said substantially triangular frames.

8. The inflatable evacuation slide according to claim 7, wherein a lower said linear beam of one of said substantially triangular frames is substantially horizontal and substantially coaxial with a lower said corner strut of an adjacent one of said inverted substantially triangular frames.

9. The inflatable evacuation slide according to claim 1, wherein said smaller triangular bracing structure is within an end triangular frame member of said triangular frame members in the series of said triangular side frame members.

* * * * *